Nov. 27, 1956  E. V. BERGSTROM ET AL  2,772,225
METHOD AND APPARATUS FOR EFFECTING
CONVERSION OF HYDROCARBONS
Filed May 24, 1952  2 Sheets-Sheet 1
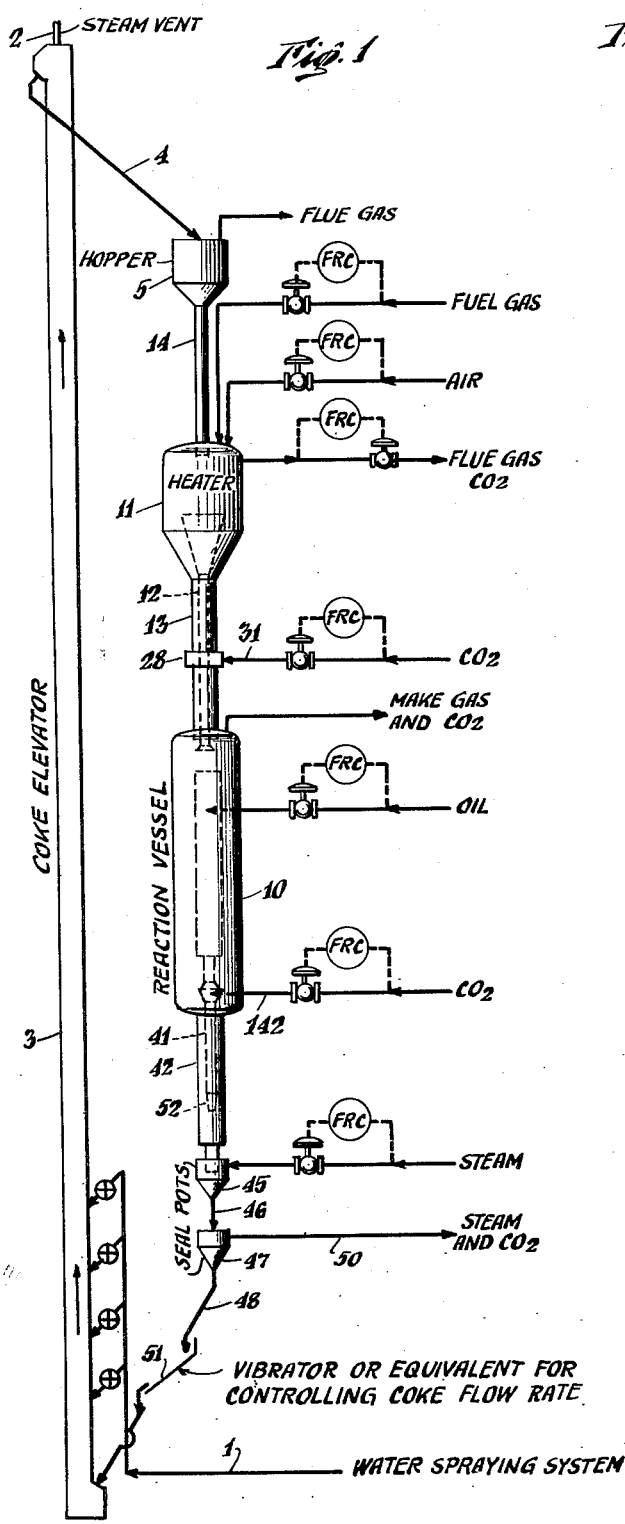
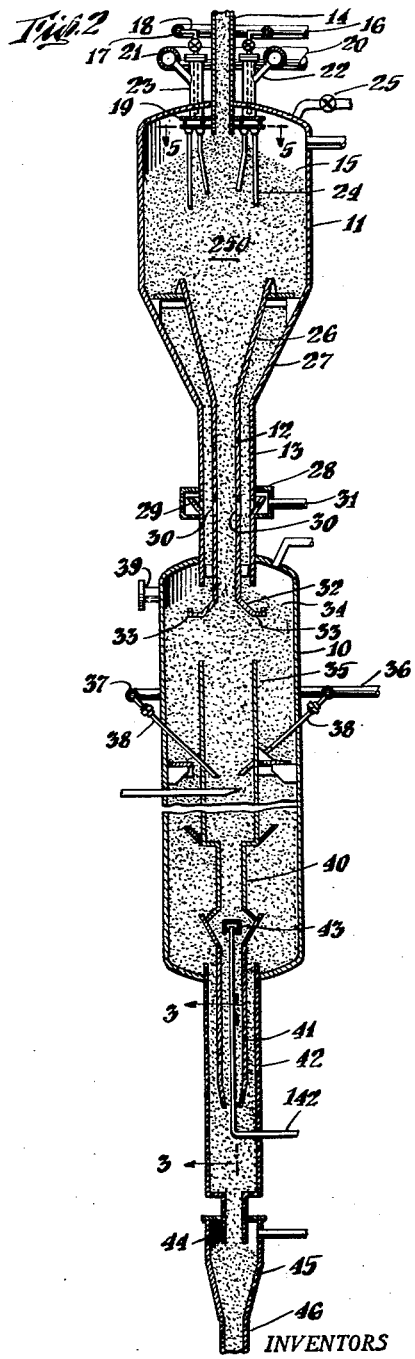
INVENTORS
Eric V. Bergstrom
BY Edward J. Sorf
Charles A. Huggett
ATTORNEY Nov. 27, 1956 E. V. BERGSTROM ET AL 2,772,225
METHOD AND APPARATUS FOR EFFECTING
CONVERSION OF HYDROCARBONS
Filed May 24, 1952 2 Sheets-Sheet 2
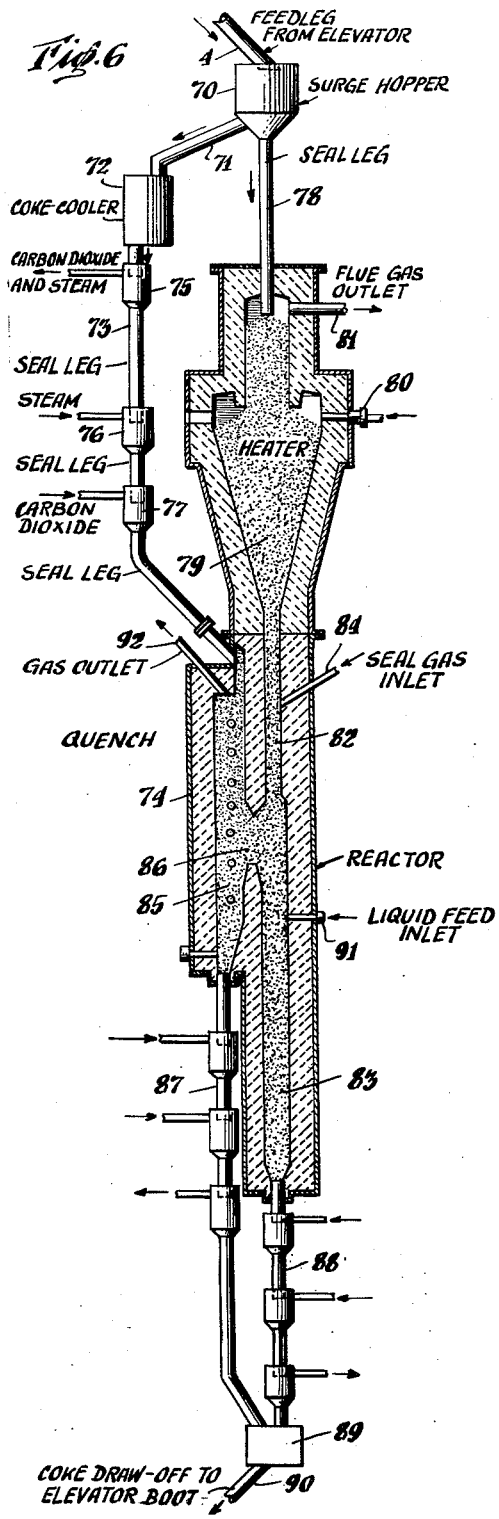
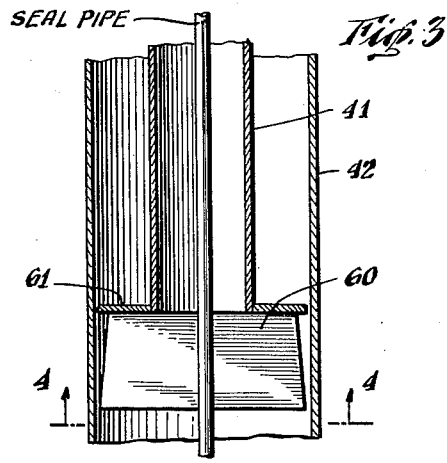
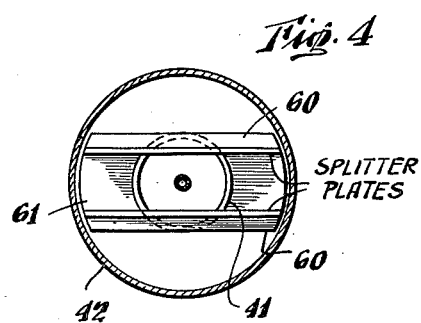
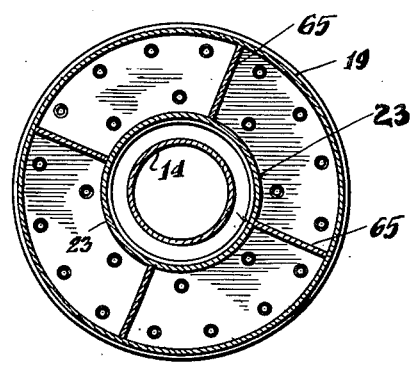
INVENTORS
Eric V. Bergstrom
BY Edward J. Sorf
Charles A. Huggett
ATTORNEY United States Patent Office 2,772,225
Patented Nov. 27, 1956

2,772,225

METHOD AND APPARATUS FOR EFFECTING CONVERSION OF HYDROCARBONS

Eric V. Bergstrom, Short Hills, and Edward J. Sorf, New Brunswick, N. J., assignors to Socony Mobil Oil Company, Inc., a corporation of New York Application May 24, 1952, Serial No. 289,822

13 Claims. (Cl. 196—52)

This invention relates to a method and apparatus for effecting chemical transformation of reactant materials at very high temperatures in the presence of a moving mass of hot granular contact material. It particularly relates to a continuous method and apparatus for heating granular solids, feeding the solids to a reaction zone to contact hydrocarbons, quenching the usually unstable reaction products, and withdrawing the solids from the reaction zone.

The invention has application to such endothermic reactions as the pyrolytic conversion of ethane, propane, butane or light gas oils to ethylene at temperatures of the order of 1450–1800° F. over an inert mass of granular material. It also has application to the manufacture of synthetic benzene or other ring compounds, useful as intermediaries or end products, in the presence of high temperature solid particles of an inert or catalytic nature. Further application is found in the high temperature cracking of gas oils to produce high octane blending stock for aviation gasoline.

It has been proposed to conduct such reactions in systems wherein a granular heat carrying material which may or may not be catalytic in nature is passed cyclically through a heating zone wherein it is heated by hot combustion gases to a temperature above the desired average hydrocarbon conversion temperature and then through a separate reaction zone wherein it is contacted with the hydrocarbon feed to effect the conversion thereof, the heat for the reaction being supplied as sensible heat in the solid heat carrying material. The resulting reaction products are then quenched in a separate quench zone.

This invention in one form involves supplying a granular contact material to a heater of expanded cross-section in which the granules in the central region are heated to a high temperature and are surrounded by contact material at lower temperature. The hot material is gravitated through an elongated conduit of restricted cross-section and the cold contact material is gravitated through a second elongated conduit of restricted cross-section which surrounds the first conduit. The outer conduit discharges the cold contact material into a reaction vessel and the inner conduit discharges hot material into the same vessel at a level beneath the outer conduit, so that a gravitating column of hot contact material is provided in contiguous contact with a surrounding column of cold contact material. The hot contact material is laterally confined throughout most of the reaction vessel from the bottom up to a level near the top. Reactant fluids are introduced into the confined portion of the hot column in the reaction vessel and passed upwardly and laterally through the cold contact material surrounding the hot material near the upper portion of the vessel to be withdrawn from the top section of the vessel. The invention also contemplates withdrawing hot contact material from the bottom of the laterally confined column through an elongated conduit of restricted cross-section surrounded by cold contact material in a second elongated conduit of restricted cross-section attached to the bottom of the reaction vessel. The invention also involves apparatus and method for introducing and withdrawing granular material from a reaction vessel in which the escape of reaction vapors is prevented with a minimum expenditure of inert seal gas which is not reactive at the conditions maintained in the reaction vessel. Other features of the invention are disclosed in the detailed description of the invention.

The object of the invention is to provide improved apparatus and method for continuously supplying hot and cold contact material to a reaction zone and continuously maintaining contiguous gravitating beds of hot and cold contact material in said zone.

A further object of this invention is to provide improved apparatus and method for preventing the escape of reactants and the contamination of the reaction products in a reaction zone through which granular contact material is continuously gravitated for effecting high temperature reactions.

A further object of this invention is to provide improved apparatus and method for heating a granular contact material to a high temperature, feeding the contact material continuously to a reaction vessel, conducting high temperature reactions in the reaction vessel by contacting reaction fluids with the hot solid material and continuously withdrawing the contact material from the vessel.

These and other objects of the invention will be made more apparent by reference to the attached figures in which:

Figure 1 is a vertical view in section of apparatus for continuously conducting high temperature reaction in the presence of a moving mass of hot solid contact material.

Figure 2 is a diagrammatic presentation of a continuous high temperature conversion of hydrocarbons in the presence of a moving bed of granular material.

Figure 3 is a sectional view of the withdrawal conduits of Figure 1 as seen on plane 3—3 of Figure 2.

Figure 4 is a sectional view of the cross-section of the withdrawal conduits of Figure 1 as seen on plane 4—4 of Figure 3.

Figure 5 is a view of the gas introduction mechanism in the heater of Figure 1 as seen on plane 5—5 of Figure 2.

Figure 6 is a vertical elevation of alternate apparatus illustrating the invention.

Referring now to Figure 1, there is shown a unitary system for effecting continuously high temperature conversions of hydrocarbons in the presence of a moving mass of heat transfer material. There is shown in vertical series a conduit 4, hopper 5, seal leg 14, heater 11, concentric depending conduits 12 and 13, reaction vessel 10, concentric depending conduits 41 and 42, seal pots 45 and 47, and conduit 48. Contact material is gravitated downwardly through the above series of vessels and conduits and conducted upwardly from the bottom of the conduit 48 to the top of conduit 4 by a suitable conveying mechanism, such as a bucket elevator 3. The overall system will be described subsequently after a more detailed discussion of the heater, reaction vessel and collecting conduits.

Referring now to Figure 2, there is shown an elongated vertical reaction vessel 10 and a superposed heater 11 with concentric connecting feed legs 12 and 13. Granular contact material is introduced into the upper portion of the heater 11 through the conduit 14 to form a bed of solids 15 in the vessel. Burner gas is passed through the conduit 16 to ring manifold 17 and depending pipes 18 to a mixing chamber 19. Air is introduced through the conduit 20 into the ring manifold 21 and then through the connecting pipes 22 and concentric pipes 23 to the mixing chamber 19. The mixing chamber 19 is in the form of a doughnut shape, horizontally mounted and carries depending gas pipes 24 which project downwardly into the granular bed 250 to locations uniformly distributed about the central region of the bed at approximately equal levels beneath the surface of the bed. The mixture of burner gas and air discharged into the bed burns in the presence of the granular solids and the combustion gas passes upwardly through the bed to the top thereof. The conduit 14 is projected downwardly into the top of the vessel 11 to provide adequate withdrawal space. The gas is withdrawn from the top of the vessel 11 through the conduit 25. The vessel 11 is made of expanded cross-section so that the hot central column of contact material in the heater is surrounded by a gravitating column of cooler material. This acts to insulate the walls of the vessel from the high temperatures prevailing in the center of the vessel. It is found that the slight amount of lateral diffusion of the hot gas through the bed can be tolerated.

A frusto-conical conduit or baffle 26 is located at the top of the inner conduit 12 beneath the central core of hot contact material to direct the hot material into the elongated conduit 12. The conduit 12 is of restricted cross-section sufficient to inhibit the longitudinal transfer of gas through the column of contact material gravitating therethrough. The lower section of the heater has a frusto-conical bottom 27 which is attached to the top of the elongated outer conduit 13, so as to direct the cooler contact material into the space between the inner and outer conduits. The outer conduit is selected to provide an annular space between the inner and outer conduits of restricted cross-section sufficient to inhibit the longitudinal transfer of gas through the column of contact material gravitating therethrough.

A seal pot 28 is attached about the outer conduit 13 at an intermediate level and communicates with the interior of the conduit through louvers 29 in the wall of the conduit. The louvers are inverted and set at an angle which is steep enough to prevent the escape of any of the solid material into the seal pot. Vertical slots 30 are located in the wall of the inner conduit 12 at the same level as the seal pot 28 and about the periphery of the pipe to allow seal gas to enter the inner conduit and thereby supply seal gas to both pipes from the single seal pot. An inert gas, preferably CO₂, is supplied to the seal pot through the conduit 31.

The outer conduit is projected downwardly into the top of the reaction vessel 10 to provide a gas disengaging region in the upper portion of the vessel. A bed of contact material is maintained in the vessel up to the terminal of the outer conduit 13. The inner conduit 12 terminates in the vessel 10 at a level beneath the terminal of the outer conduit. A frusto-conical baffle 32 is attached to the bottom of the conduit 12 to gradually enlarge the stream of hot contact material in the reaction vessel. It has been found that the use of an enlarging baffle at this location, when feeding beneath a bed of solid material, effects more uniform and satisfactory withdrawal of the gravitating material from the conduit. A flat, disc-shaped ring baffle 33 is attached to the bottom of the conical baffle 32 to direct the annular stream of cooler contact material toward the outer region of the reaction vessel 10. A rim 34 of wear-resistant material is attached to the periphery of the baffle 33 to hold up a supply of the contact material and thereby provide a surface of contact material against which the moving material will rub. This causes a small amount of attrition of the solids instead of the wearing of the baffles at the bottom of the conduit 12.

A partition 35 is centrally located in the reaction vessel to confine a central column of gravitating hot solids surrounded by cooler solids. It is seen that there are contiguous gravitating beds of hot and cold contact material for a short distance in the upper portion of the vessel, the cooler material completely encircling the hot material to form a suitable quench bed. The ring partition or baffle 35 laterally separates the two beds, providing a substantially enclosed reaction zone. The reactant fluids are introduced through the conduit 36 to the ring manifold 37 and feed pipes 38 which project into the reaction chamber at a level a substantial distance below the top of the partition. The reactant fluids travel upwardly through the gravitating bed of hot contact material and are heated thereby to a temperature high enough to effect the desired conversion. The reaction products issue from the top of the ring partition 35 and travel upwardly and outwardly through the cooler contact material to the surface of the bed. The heated products are thereby rapidly cooled and undesirable side reactions are prevented. The cooled reaction products are withdrawn from the vessel through the conduit 39.

The ring partition 35 may be in the form of an upright cylindrical vessel, terminating at its lower end a substantial distance above the bottom of the vessel 10 and having a central discharge conduit 41 projected downwardly through the bottom of the vessel 10. A discharge conduit 42 is attached to the bottom of the vessel 10 being substantially concentric with the conduit 41, so as to provide for the withdrawal of the cooler contact material in the form of an annular stream of solids surrounding the inner conduit. The inner conduit 41 is terminated within the outer conduit 42 and at a level a substantial distance above the bottom of the outer conduit. The hot solids are therefore mixed with the cooler solids to form a single gravitating stream. A seal pipe 142 is projected into the outer conduit 42 at a level beneath the bottom of the inner conduit 41 and directed up into the inner conduit to a level near the top of the inner conduit. A cap 43 is located over the end of the seal pipe 42 to prevent solids from entering the pipe. The conduit 40 is enlarged at the level of the cap 43 so that the cap does not interfere with the flow of solids through the conduit 40. An inert gas which is non-reactive at the conditions in the reaction zone is introduced through the seal pipe in sufficient amount to effect a seal of the inner conduit and prevent the downward movement of reaction products. Carbon dioxide or nitrogen can be used for this purpose. Some of the seal gas travels upwardly through the reaction zone and some of it travels downwardly through the conduit 41 to the lower section of the outer conduit 42. In travelling through the lower section of the conduit 42 where both the hot and cold streams are combined, the single seal gas serves as a seal for both discharge columns of contact material. The lower end of the outer conduit 42 is terminated in a short conduit 44 of restricted cross-section which is projected downwardly into a seal pot 45. Steam is introduced into the seal pot at a pressure slightly lower than that at which the carbon dioxide is introduced in the conduit 40 above, so that the downwardly moving carbon dioxide mixes with the steam and the mixed gases travel downwardly through the contact material in a conduit 46 attached to the bottom of the seal pot.

Referring once again to Figure 1, the contact material in conduit 46 is delivered into a second seal pot 47. The mixture of steam and carbon dioxide is withdrawn from the seal pot 47 through the conduit 50. This method and apparatus is particularly advantageous for sealing a reaction zone in which high temperature hydrocarbon conversion reactions are conducted. There are many such reactions in which it is not desirable to have steam present. For example, when using hot coke as the heat carrying material, the steam would effect a water-gas reaction and contaminate the reaction products. This can be avoided by using an inert gas which is not reactive at the conditions obtaining in the reaction zone, such as carbon dioxide or nitrogen. This is introduced through the conduit 142 at a level a substantial distance below the level of introduction of the hydrocarbons, so that the elongated column of contact material serves to inhibit the longitudinal flow of gas therethrough. By using elongated seal legs of restricted cross-section, the amount of seal gas needed is minimized. Also, since the inner conduit 41 is shorter than the outer conduit 42, only one stream of carbon dioxide gas is required to seal both legs. Steam is introduced into the seal pot 45 to mingle with the carbon dioxide and flow downwardly to the seal pot 47. The seal leg 46 between the seal pots is made long enough to substantially inhibit the longitudinal transfer of gas through the column of contact material, minimizing the total amount of seal gas required. The steam is admitted into the seal pot 45 at a pressure just below the pressure at which the carbon dioxide is admitted, so that the gases pass downwardly through the column of contact material. Since the carbon dioxide is more expensive and more difficult to obtain than steam, this apparatus and method makes it possible to use a minimum of carbon dioxide, just sufficient to prevent steam from entering the reaction zone, and then use the cheaper more readily available steam to make up the remaining seal gas requirements. Although only carbon dioxide is shown as the seal gas admitted to the seal pot 28 to seal the legs between the heater and the reaction vessel, the same procedure can be adopted as shown for the withdrawal of solids from the reaction vessel. For example, carbon dioxide in minimum quantity can be admitted through the seal pot 28 and steam admitted at a higher level. The mixture of steam and carbon dioxide can be withdrawn through the heater or more preferably at a level below the heater. It is preferred, however, when using a solid such as coke to use only a carbon dioxide or nitrogen seal on the feed leg to the reaction vessel. A valve 51 or other flow control means is located in the conduit 48 to regulate the total flow rate of the solids through the system. Splitter plates 52 or a frusto-conical baffle is located at the bottom of the inner conduit 42 to control the ratio of the flow rate of the hot contact material to that of the cold. The splitter plates will be described in more detail subsequently. The contact material may be lifted by an elevator of the Redler or bucket type or may be elevated by a dilute phase gas lift or mass flow lift. When a bucket elevator 3 is used, it may be desirable to cool the contact material in the bottom of the lift to prevent damaging the moving mechanism from excessive heat. This can be done by introducing a water spray through the conduit 1 and withdrawing steam through the vent 2 in the top of the elevator housing.

Referring now to Figures 3 and 4, there is shown an enlarged fragmentary view of the lower end of the inner conduit 41 in which splitter plates 60 are used to adjust the flow rate of the hot contact material relative to that of the cold contact material. The plates are flat and thin, attached at opposite sides of the bottom of the inner conduit 41 with the lower end of each plate pitched inwardly a small amount, so as to provide a discharge aperture of restricted cross-section. The plates are connected to two flat legs 61 which are horizontally disposed at the bottom of the inner conduit 41 and shaped to fill that portion of the annular space between the inner and outer conduits between the splitter plates. The contact material flow in the outer conduit is restricted to that portion of the cross-section outside the splitter plates. By bringing the lower ends of the splitter plates closer together, the flow rate of the hot solids can be reduced without reducing the flow rate of the cold solids. This can also be accomplished by attaching a suitably shaped frusto-conical baffle to the lower end of the inner conduit.

Referring now to the heater and more particularly Figure 5, there is shown a horizontal cross-section of the burner gas and air-mixing chamber 19. The chamber is divided into four separate compartments by the partitions 65. The drop pipe outlets 24 are uniformly distributed across each compartment and a single pair of concentric gas and air feeding pipes are centrally located in each compartment to supply the necessary gas and air.

Referring now to Figure 6, there is shown an alternate arrangement of the apparatus which illustrates certain features of this invention. Contact material from the elevator 3 is introduced into the surge hopper 70 through the conduit 4. A stream of the solids is taken through the conduit 71 to a cooler 72 and thence downwardly through the elongated leg 73 into the upper portion of the vessel 74. Three seal pots are located at spaced levels along the conduit 73, to provide for carbon dioxide and steam introduction and seal gas withdrawal from the top pot 75, as previously described. The carbon dioxide pot 77 is located at the bottom with the steam pot 76 being placed intermediate the other pots. A second conduit 78 is attached to the bottom of the surge hopper and projected downwardly into the top portion of the vessel 74. The upper portion of the vessel 74 has an expanded chamber 79, designed to serve as a heater. A mixture of burner gas and air is introduced into the chamber 79 through the conduit 80 to burn in the presence of the solids and heat them to a very high temperature. The combustion gas is removed from the heating chamber 79 through the outlet conduit 81. The cross-section of the heating chamber 79 is gradually reduced to provide a passageway 82. The passageway 82 connects with the reaction chamber 83. An inert seal gas is introduced into the passageway 82 through the conduit 84 to seal the reaction zone. A quench chamber 85 is located in side-by-side relationship with the reaction chamber 83 and in open communication therewith through an aperture 86 in the dividing wall between the chambers. The quench zone is supplied contact material by the conduit 73, which communicates with the top of the chamber. The contact material is withdrawn from the bottom of the quench chamber and reaction chamber through the conduits 87 and 88. These conduits are elongated and of restricted cross-section, to serve as seal legs, and have the triple seal pot arrangement previously described in detail. The conduits both connect into the chamber 89 and the combined stream of solids is withdrawn through the conduit 90 to the bottom of the elevator 3. Reactant hydrocarbons are introduced into the reaction zone through the conduit 91 in liquid or vapor phase. The vapors pass upwardly through the bed of gravitating solids in the reaction zone and laterally through the port 86 into the quench column, whereby secondary reactions are prevented. The cooled reaction products are withdrawn from the top of the quench zone through the conduit 92.

*Example 1*

As an illustration of the invention, crude petroleum or gas oil can be converted to ethylene with yields in the order of 30 percent by weight by cracking at a temperature about 1500° F. over hot granular coke. In system similar to that shown on Figures 1 and 2, a total flow rate of about 6.6 tons/hour is considered satisfactory for a 50 bbl./day conversion of gas oil. The temperature of the solids in the hopper 5 is about 600° F., and that in the center of the heater 11 about 1585° F. The temperature of the solids in the ring partition drops to about 1525° F. and the temperature of the solids at the top of the column surrounding the ring partition is about 600° F. The solids flow through the central reaction zone is about 2.8 tons/hour and the solids flow through the surrounding quench zone is about 3.8 tons/hour. About 115 pounds/hour of $CO_2$ is introduced through the pipe 142 into the column of solids in the conduit 41. About 250 pounds/hour of steam is introduced into the combined stream of solids from the reaction and quench zones through the seal pot 45. About 280 pounds/hour of steam and 25 pounds/hour of $CO_2$ is removed from the column through the seal pot 47. About 314 pounds/hour of $CO_2$ is introduced through the common seal pot 28 into both columns of solids to seal the heater from the reactor.

It will be understood that the invention is not intended to be restricted to the specific examples of structure, or operation and application given hereinbefore and it is intended to cover all changes and modifications of the examples of the invention herein chosen for purposes of disclosure which do not constitute departures from the spirit and scope of the invention.

We claim:

1. A method of withdrawing granular contact material from a high temperature reaction zone in which hydrocarbons are converted to gasiform products which comprises: withdrawing a downwardly moving stream of contact material in substantially compacted columnar form, of restricted cross-section and of sufficient length to inhibit the transfer of gas into or out of the reaction zone, introducing a first gas, which is not reactive under the conditions in the reaction zone, into the column of contact material at a level below the reaction zone, at a pressure slightly higher than the pressure in the reaction zone, introducing a second gas, which is reactive under the conditions in the reaction zone, into the column of contact material at a level below the level at which the first gas is introduced at a pressure which is slightly lower than the pressure of the first gas, and withdrawing a mixture of the first and second gases from the column of contact material at a level below the level at which the second gas is introduced.

2. A method for effecting high temperature conversion of hydrocarbons to produce gasiform products which comprises: introducing granular contact material into a confined reaction zone, passing the granular contact material as a substantially compact column downwardly through the confined reaction zone, introducing hydrocarbons into the column of contact material in said reaction zone, withdrawing gaisform products from the column of contact material in said reaction zone, withdrawing contact material from said zone downwardly to a first seal zone as a substantially compact stream of particles of restricted cross-section, of sufficient length to inhibit the downward transfer hydrocarbons, withdrawing contact material downwardly from said first seal zone to a second seal zone as a substantially compact section, of sufficient length to inhibit the transfer of gas between the first and second seal zones, withdrawing contact material downwardly from said second seal zone to a third seal zone as a substantially compact stream of particles of restricted cross-section, of sufficient length to inhibit the transfer of gas between said second and third seal zones, introducing an inert seal gas which is non-reactive under the conditions obtaining in the reaction zone into the first seal zone at a pressure slightly higher than the pressure in said reaction zone, introducing a seal gas which is reactive under the conditions obtaining in the reaction zone into the second seal zone at a pressure slightly lower than the pressure in said first seal zone, withdrawing a mixture of both seal gases from the third seal zone at a pressure slightly lower than the pressure in said second seal zone, and withdrawing contact material from the bottom of said third seal zone.

3. A method for effecting high temperature conversion of hydrocarbons to produce gasiform products which comprises: introducing granular contact material into a confined reaction zone, passing the granular contact material downwardly as a substantially compact column through the confined reaction zone, introducing hydrocarbons into the column of contact material in said reaction zone, withdrawing gasiform products from the column of contact material in said reaction zone, withdrawing contact material from said zone, downwardly to a first seal zone as a substantially compact stream of particles of restricted cross-section, of sufficient length to inhibit the downward transfer of hydrocarbons, withdrawing contact material downwardly from said first seal zone to a second seal zone as a substantially compact stream of particles of restricted cross-section, of sufficient length to inhibit the transfer of gas between the first and second seal zones, withdrawing contact material downwardly from said second seal zone to a third seal zone as a substantially compact stream of particles of sufficient length to inhibit the transfer of gas between said second and third seal zones, introducing carbon dioxide gas, which is non-reactive under the conditions obtaining in the reaction zone, into the first seal zone at a pressure slightly higher than the pressure in said reaction zone, introducing steam, which is reactive under conditions obtaining in the reaction zone, into the second seal zone at a pressure slightly lower than the pressure in said first seal zone, withdrawing a mixture of both seal gases from the third seal zone, at a pressure slightly lower than the pressure in said second seal zone, and withdrawing contact material from the bottom of said third seal zone.

4. A method for feeding granular solid contact material to a reaction zone in which high temperature conversion of hydrocarbons is effected which comprises: gravitating contact material downwardly to a first seal zone, withdrawing contact material downwardly from said first seal zone as a substantially compact stream of particles of restricted cross-section, of sufficient length to inhibit the transfer of gas between the first and second seal zones, withdrawing contact material downwardly from said second seal zone to a third seal zone as a substantially compact stream of particles of restricted cross-section, of sufficient length to inhibit the transfer of gas between said second and third seal zones, withdrawing contact material downwardly from said third seal zone to the reaction zone as a substantially compact stream of particles of restricted cross-section, of sufficient length to inhibit the transfer of gas between said third seal zone and the reaction zone, passing the contact material downwardly through the reaction zone as a substantially compact column, introducing hydrocarbons into the column of contact material in said reaction zone, withdrawing gasiform products from the column of contact material in said reaction zone, withdrawing contact material from said reaction zone, introducing an inert seal gas which is non-reactive under the conditions obtaining in the reaction zone into the third seal zone at a pressure slightly higher than the pressure in said reaction zone, introducing a seal gas which is reactive under the conditions obtaining in the reaction zone into the second seal zone at a pressure slightly lower than the pressure in said third seal zone and withdrawing a mixture of both seal gases from the first seal zone at a pressure slightly lower than the pressure in said second seal zone.

5. A process for effecting high temperature conversions of a hydrocarbon charge to gasiform products which are unstable at the reaction temperature comprising: maintaining a substantially compact column of granular contact material in a confined zone, gravitating hot contact material downwardly as an elongated substantially compact column of particles of restricted cross-section and sufficient length to inhibit the flow of gas longitudinally therethrough, introducing said particles into said confined zone intermediate its lateral boundaries and at a level beneath the surface of the column in said confined zone, gravitating cooler contact material downwardly as an elongated substantially compact column of particles of restricted cross-section and sufficient length to inhibit the flow of gas longitudinally therethrough, the cooler column of gravitating particles laterally enclosing and being laterally separated from the hot column of particles, introducing the cooler particles into said confined zone at a level above the level of introduction of the hot particles, to form the surface of the column of gravitating granular material in said confined zone, baffling of the flow of the cooler contact material in said confined zone to direct the contact material laterally away from the center of the confined zone to form a central high temperature reaction zone surrounded by a cooler quench zone, the reaction and quench zones being laterally separated up to a level a substantial distance below the level at which the hot contact material is introduced into the confined zone, introducing hydrocarbons into the central reaction zone to pass upwardly through the hot contact material and upwardly and laterally through the cooler contact material about the upper portion of the reaction zone to the top of the column in said confined zone, withdrawing converted products from the confined zone, gravitating contact material downwardly from said reaction zone as a substantially compact column of particles of restricted cross-section and sufficient length to inhibit the flow of gas longitudinally therethrough, gravitating contact material downwardly from the quench zone as a substantially compact column of particles of restricted cross-section and sufficient length to inhibit gas flow longitudinally therethrough, the column withdrawn from the quench zone enclosing and being laterally separated from the column withdrawn from the reaction zone, and withdrawing contact material from the bottom of both columns.

6. A process for effecting high temperature conversions of a hydrocarbon charge to gasiform products which are unstable at the reaction temperature comprising: maintaining a substantially compact column of granular contact material in a confined zone, laterally separating the lower portion of the column in the confined zone so as to provide a central reaction zone surrounded by a quench zone, gravitating particles downwardly as an elongated laterally confined column of hot granular contact material surrounded by an elongated laterally confined column of cooler contact material, the columns being long enough to substantially inhibit the longitudinal transfer of gas, discharging the outer column of contact material onto the top of the column in said confined zone, discharging the inner column of contact material into said confined zone at a level beneath the top of the column in the confined zone but above the level of the lateral partition between the reaction and quench zones, directing contact material from the inner column into the reaction zone, directing contact material from the outer column into the quench zone, withdrawing contact material from the bottom of the reaction zone, withdrawing contact material from the bottom of the quench zone, introducing hydrocarbons into said reaction zone at a level below the top of the lateral partition separating the reaction and quench zones so as to travel upwardly through the hot contact material and then upwardly and laterally through the cooler contact material to the surface of the column in the confined zone, and withdrawing the cooled conversion products from the top of the column in said confined zone.

7. A process for effecting high temperature conversions of a hydrocarbon charge to gasiform products which are unstable at the reaction temperature comprising: maintaining a substantially compact column of granular contact material in a heating zone of expanded cross-section, introducing granular contact material into the heating zone to maintain the column therein, introducing combustion compounds into the central portion of the heating zone to burn in a central nucleus, producing a gravitating column of hot particles surrounded by a gravitating column of cooler particles, withdrawing combustion gas from the heating zone, gravitating hot granular material downwardly from the central portion of said heating zone as an elongated laterally confined column, gravitating cooler granular material downwardly from the outer portion of said heating zone as an elongated laterally confined column which surrounds the column of hot contact material, the columns being of restricted cross-section and of sufficient length to substantially inhibit longitudinal transfer of gas therethrough, discharging the outer column of material onto the top of the column of contact material in a separate confined zone, discharging the inner column of contact material into said confined zone at a level beneath the top of the column in said zone, the column of contact material in said confined zone up to the level beneath the level of discharge of the inner column being laterally separated into a central reaction zone and a surrounding quench zone, directing the hot contact material into the central reaction zone and the cooler contact material into the surrounding quench zone, introducing hydrocarbons into the central reaction zone so as to pass upwardly through the hot contact material and then through the cooler contact material to the surface of the column in said confined zone, withdrawing the reaction products from the upper portion of the confined zone, withdrawing hot contact material from the bottom of the reaction zone and withdrawing the cooler contact material from the bottom of the quench zone.

8. The method of withdrawing granular contact material from a high temperature reaction zone and from a cool quench zone which surrounds the reaction zone which comprises: withdrawing a laterally confined elongated column of particles of restricted cross-section downwardly from the bottom of the reaction zone, withdrawing a second laterally confined elongated column of particles of restricted cross-section downwardly from the bottom of the quench zone, discharging hot contact material from the bottom of the first column into the second column so as to mix with the cooler contact material and form a single laterally confined column, introducing an inert seal gas into the inner column of particles at a level near the top of the column, passing the inert seal gas downwardly through the inner column to the bottom of the column formed by the merging of the inner and outer column, so as to effectively seal both the inner and outer columns, restricting the cross-section of the inner column at its lower end so as to determine the ratio of flow rate of the inner column relative to that of the outer column, and throttling the combined stream of contact material beneath the lower end of the inner column so as to regulate the flow of contact material through the reaction and quench zones.

9. An apparatus for conducting high temperature fluid reactions in the presence of a moving granular material comprising in combination: an elongated upright vessel adapted to confine a column of contact material, a ring partition mounted vertically in said vessel and spaced apart from the walls of the vessel, the ring partition being open on its upper end, a first elongated substantially vertical conduit of restricted cross-section having its lower end projected into the top of said upright vessel in lateral alignment with the ring partition, a second elongated conduit surrounding the first conduit, being spaced apart from the first conduit on all sides and having its lower end projected into the top of said upright vessel, the inner conduit terminating at a level beneath the bottom of the outer conduit but above the top of the ring partition, baffle means attached to the lower end of the inner conduit so as to direct contact material gravitated between the conduits into the region between the ring partition and the walls of the upright vessel, means to withdraw contact material from the lower section of the region enclosed by said ring partition, means to withdraw contact material from the lower section of the region between the ring partition and the wall of the upright vessel, a reactant inlet extending into said vessel and terminating in the region enclosed by the ring partition at an intermediate level, and means for withdrawing reaction products from the upper section of said vessel.

10. Apparatus for effecting the high temperature conversion of materials unstable at the reaction temperature in the presence of a moving granular material comprising in combination: an elongated upright vessel adapted to confine a column of contact material, a ring partition mounted vertically in said vessel and spaced apart from the walls of the vessel, the ring partition being open on its upper end, a heater of expanded cross-section located a substantial distance above the upright vessel, a first elongated substantially vertical conduit of restricted cross-section, terminated on its upper end in the lower section of the heater and on its lower end in the upper section of the upright vessel, a second elongated conduit surrounding the first conduit, being spaced apart from the first conduit on all sides, the second conduit being similarly terminated on its upper end in the lower section of the heater and on its lower end in the upper section of the upright vessel, the inner conduit terminating on its lower end at a level beneath the bottom of the outer conduit but above the top of the ring partition, baffle means attached to the bottom of the inner conduit for directing contact material gravitated between the conduits to the outer regions of the upright vessel, an inlet conduit for heating fluid extending into said heater at an intermediate level and terminating at a location substantially spaced away from the confining walls of the vessel, an outlet for heating fluid connected near the upper end of said heater so that a central core of contact material in said heater is heated to a temperature above that of the surrounding contact material, baffle means for directing the hot contact material into the inner elongated conduit, baffle means for directing the cooler contact material into the outer conduit, means for introducing contact material into the upper portion of said heater, means to withdraw contact material from the lower section of the region enclosed by said ring partition, means to withdraw contact material from the lower section of the region between the ring partition and the walls of the upright vessel, a reactant inlet extending into said vessel and terminating in the region enclosed by the ring partition at an intermediate level, and means for withdrawing reaction products from the upper section of said upright vessel.

11. Apparatus for effecting the high temperature conversion of unstable materials in the presence of a moving granular material comprising: an upright reaction vessel of expanded cross-section, a heater of expanded cross-section located a substantial distance above the upright vessel, a first elongated substantially vertical conduit of restricted cross-section terminated on its upper end in the lower section of the heater and on its lower end in the upper section of the reaction vessel, a second elongated conduit surrounding the first conduit, being substantially concentric therewith, the second conduit being similarly terminated on its upper end in the lower section of the heater and on its lower end in the upper section of the reaction vessel, the inner conduit terminating at its lower end at a lower level than the lower end of the outer conduit, an inlet conduit for heating fluid extending into said heater at an intermediate level and terminating at a central location in said vessel, an outlet for heating fluid in the upper portion of said heater, a frusto-conical baffle attached to the top of said inner conduit so as to direct hot contact material into the inner conduit and direct the cooler contact material into the region between the inner and outer conduits, a flat ring baffle attached to the lower end of the inner conduit so as to direct the cooler contact material discharged from the outer conduit outwardly toward the walls of the reaction vessel, a reactant inlet extending into said reaction vessel at an intermediate level and terminating at a central location, an outlet for reaction products in the upper portion of the reaction vessel, first means for introducing a seal gas into the inner and outer conduits at a level near the reaction vessel, second means for introducing a seal gas into the inner and outer conduits at a second level a spaced distance above the first level, means for withdrawing seal gas from the inner and outer conduits at a level a spaced distance above the second level, means for introducing contact material into the top of the heater and means for withdrawing contact material from the bottom of the reaction vessel.

12. Apparatus for withdrawing granular solids from a high temperature reaction chamber surrounded by a cool quench chamber comprising: an elongated substantially vertical conduit attached at its upper end to the bottom of the reaction chamber, a second elongated conduit surrounding the first conduit and substantially concentric therewith, the second conduit being attached at its upper end to the bottom of the quench chamber, the inner conduit terminating at its lower end at a level a substantial distance above the bottom of the outer conduit, a frusto-conical restricting baffle attached to the lower end of the inner conduit, a gas inlet projected into the inner conduit and terminating at a level near the top of the conduit, so as to provide a gas seal for both the inner and outer conduits, and means for throttling the flow of solids located in the outer conduit below the bottom of the inner conduit.

13. In a system including means for gravitating downwardly a high temperature granular contact material as a compact column through a central seal leg between a heater and a reactor and for gravitating downwardly a cooler granular contact material as a compact column through an annular seal leg surrounding the central seal leg, apparatus for introducing an inert seal gas into the seal legs intermediate the heater and reactor comprising a housing surrounding the outer seal leg intermediate the ends thereof, a seal gas inlet pipe connected with said housing, a louver in the wall of said outer seal leg within said housing, and means defining an opening in the wall of the inner seal leg at the same elevation as the louver in the outer seal leg, whereby seal gas introduced into the housing is introduced into both the outer and inner seal legs.

References Cited in the file of this patent
UNITED STATES PATENTS 2,344,449    Ogorzaly    Mar. 14, 1944
2,548,286    Bergstrom    Apr. 10, 1951